(12) United States Patent
Chamel

(10) Patent No.: US 6,250,835 B1
(45) Date of Patent: Jun. 26, 2001

(54) POLES AND TERMINALS EQUIPPED WITH CONNECTION TO THE GROUND WITH BREAKING POINT

(75) Inventor: Didier Chamel, 6, clos des Veloutiers, Soucieu en Jarrest, 69510 (FR)

(73) Assignees: Didier Chamel, Jarrest; Christian Pardon, Lyons, both of (FR)

(*) Notice: Subject to any disclaimer, the term of this patent is extended or adjusted under 35 U.S.C. 154(b) by 0 days.

(21) Appl. No.: 09/331,867
(22) PCT Filed: Dec. 26, 1997
(86) PCT No.: PCT/FR97/02434
  § 371 Date: Jun. 29, 1999
  § 102(e) Date: Jun. 29, 1999
(87) PCT Pub. No.: WO98/29607
  PCT Pub. Date: Jul. 9, 1998

(30) Foreign Application Priority Data

Dec. 30, 1996 (FR) .................................................. 96 16373

(51) Int. Cl.⁷ .................................................. F16M 13/00
(52) U.S. Cl. .................................. 403/2; 403/362; 52/98; 248/548
(58) Field of Search .......................... 403/2, 362; 404/6, 404/9; 52/98, 99; 248/900, 548; 256/13.1, DIG. 5

(56) References Cited

U.S. PATENT DOCUMENTS

| | | | |
|---|---|---|---|
| 3,349,531 | * 10/1967 | Watson | 52/98 X |
| 3,381,427 | * 5/1968 | Watson | 52/98 |
| 4,858,876 | * 8/1989 | Moreno | 248/548 X |
| 4,923,319 | 5/1990 | Dent . | |
| 4,926,592 | * 5/1990 | Nehls | 52/98 |
| 5,480,121 | * 1/1996 | Rice et al. | 248/548 |
| 5,484,217 | * 1/1996 | Carroll et al. | 403/2 |
| 5,855,443 | * 1/1999 | Faller et al. | 403/2 |
| 5,860,253 | * 1/1999 | Lapointe | 52/98 |
| 6,113,055 | * 9/2000 | Salman | 248/548 |

FOREIGN PATENT DOCUMENTS

| 572131 | 1/1976 | (CH) . |
|---|---|---|
| 2704011 | 10/1994 | (FR) . |

* cited by examiner

Primary Examiner—Lynne H. Browne
Assistant Examiner—David E. Bochna
(74) Attorney, Agent, or Firm—Dowell & Dowell, P.C.

(57) ABSTRACT

A pole or the like formed by an anchoring member and a vertical member which are linked by a linking piece having a zone of lower resistance to force. Block members are provided at the opposite ends of the anchoring member and the vertical member each of which has a central bore for receiving the linking piece and at least one of the block members has a surface slopping from its center towards it periphery such that a space between the opposite block members is greater at the periphery of the pole than at its center.

11 Claims, 4 Drawing Sheets

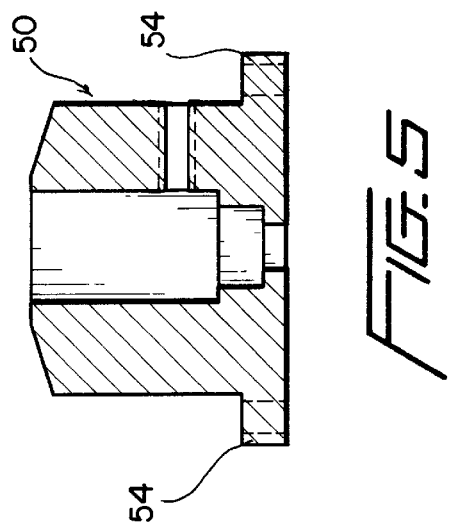
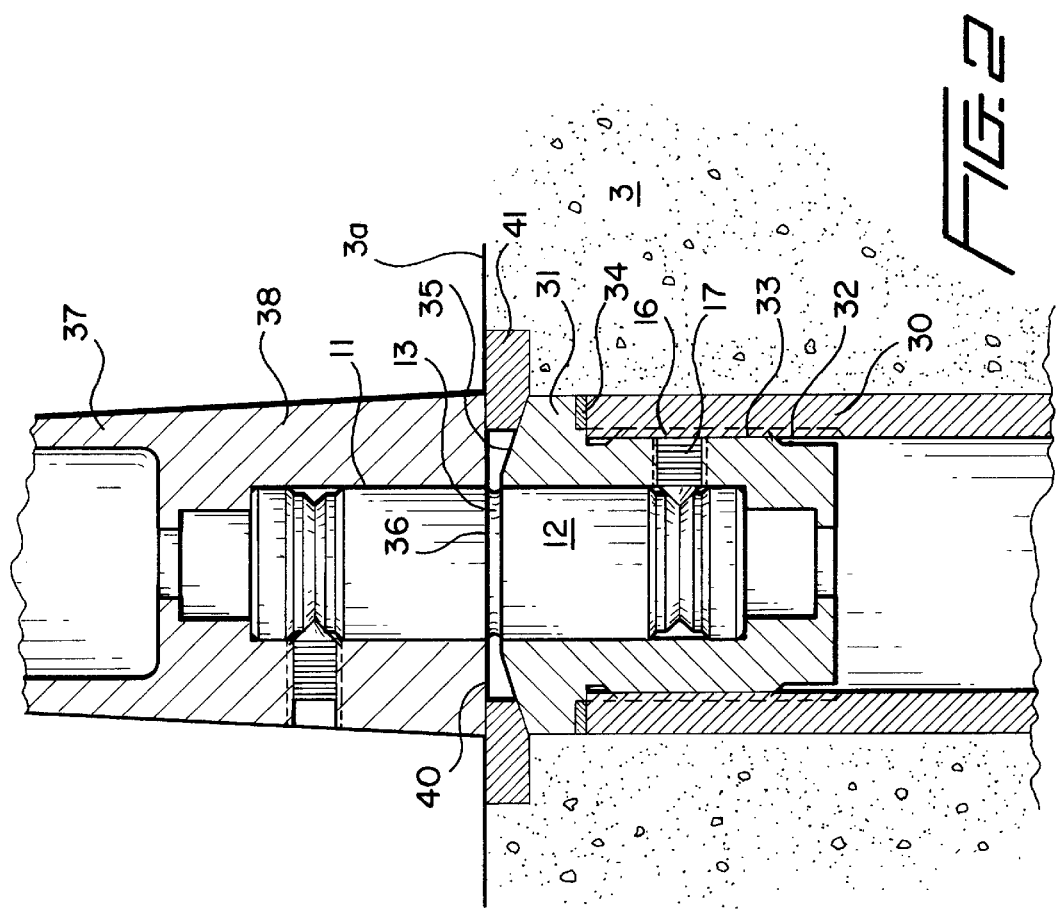

POLES AND TERMINALS EQUIPPED WITH CONNECTION TO THE GROUND WITH BREAKING POINT

BACKGROUND OF THE INVENTION

1. Field of the Invention

The present invention relates to an improvement in poles, markers and the like provided with a device for linking to the ground with breaking point, in particular anti-parking posts or vertical signalling markers used in road signalling.

2. Description of the Related Art

It is relatively expensive to replace markers and posts damaged further to a shock by a vehicle, insofar as not only must the damaged part be replaced, but it has to be unsealed and the replacement part sealed.

In the past, it has therefore been proposed to fix the signalling markers or posts with the aid of a ground-linking device comprising a breaking part, so that, in the event of shock by a vehicle, only the linking piece or one of its elements is deformed or broken. It follows that, in principle, only the linking piece and/or the corresponding element are to be replaced.

U.S. Pat. No. 3,340,531 in particular discloses such a linking device. This document provides fixing the pole to the ground via a sealed base having a hollow tube with the diameter of the pole, the link between this hollow tube and the pole being ensured by a linking piece which is placed, half in this hollow tube and half in the pole. This linking piece presents a median circumferential thin section intended to form the zone of deformation or of rupture. This linking piece may be pierced in its length so as to receive a sling intended to maintain the pole and the base together when the linking piece has broken. The major drawback of this device consists in the risk of damaging the opposite edges of the pole and the base. In effect, in the event of a considerable shock, bringing about complete rupture of the linking piece, the edges of the pole and of the base may violently strike one another or part of the linking piece.

U.S. Pat. No. 3,912,405 discloses another device of this type, comprising a linking piece of which a part is interposed between the pole and the tube sealed in the ground, having the same diameter as the latter but having a thinned rupture zone. Inside this linking piece there extends a flat iron element intended to maintain the sealed tube and pole together after rupture of the linking piece. The geometry of this flat iron element is not favourable to correct functioning of this device apart from a shock perpendicular to the plane of this piece.

SUMMARY OF THE INVENTION

It is an object of the present invention to provide an improved linking device fully performing its role while avoiding any damage of the pole and of the base.

Another object of the invention is to provide such a device which may be adapted to poles of different geometrical shapes.

A further object of the invention is to provide a device which may be used with a base not projecting above ground level.

Yet another object of the invention is to be able to propose such a device not having a part projecting with respect to the pole on inclined ground.

The present invention has for its object a pole, marker or the like formed by an anchoring post and a vertical member or upright, in particular a tube, the anchoring post and upright being linked together by a linking piece, preferably cylindrical, having a zone of lesser resistance to force. The assembly is arranged so that the opposite edges of the anchoring post and the upright have a space therebetween in which the zone of lesser resistance is provided. The linking piece, possibly having a central longitudinal bore, receives a sling or the like shaped to provide a link between the anchoring post and upright after rupture of the linking piece. The post and the upright each include a plate or block element, the two plates oppose one another and at least one has a surface sloping from its center towards its periphery such that the space between the two plates is greater at the periphery of the pole than at its center.

The linking piece is therefore centered on the median axis of the pole and of the anchoring post.

The linking device according to the invention, formed by the two plates and the linking piece, may be used for any street structure fixed to the ground by one or more uprights or poles. Without this being exhaustive, mention may be made of anti-parking posts or markers, barriers, benches, candelabra, signalling, in particular road-signalling masts, advertizing supports and panels, luminous markers, supports of all types, such as trashcan supports. The expression pole, marker or the like is therefore intended to cover all of the possibilities.

The inclined surface of the plate is preferably a surface of generally convex shape. Advantageously, the curvature or the angle of the inclined surface is chosen so that the linking piece breaks before contact between the plates. In any case, the curvature makes it possible to avoid any contact between the edges of the plates. Possible contacts will be made in resistant zones of the plates. In addition, the plates may advantageously be pieces which are solid or of thickness greater than the thickness of the poles, and therefore present a high resistance.

According to the invention, the plates may have an outer diameter identical to or different from that of the anchoring post or the upright which bear them. It will very advantageously be identical when plate and pole will be off-the-ground in order not to increase the dimensions and to avoid any projecting part. The plate or plates may be fixed definitively, for example by welding, or be made in one piece with the upright and/or the anchoring post, or be removably fixed by any means known per se.

According to a particularly advantageous modality, anchoring post and corresponding plate are removably fixed together and are arranged so as to be able to be placed below ground level or substantially at that level. A circular, preferably flat, supple joint is provided between the two plates, preferably on their periphery. This embodiment ensures a certain tightness and renders invisible the adaptation of the pole or marker while allowing the linking piece to be easily changed after a shock. The outer diameter of the joint is preferably larger than or equal to that of the upper plate or the upright, which advantageously makes it possible to preserve the seal and the plate in the event of rupture. In the event of rupture, the upper plate linked to the upright does not come into contact with the seal, but with the joint. The joints are preferably chosen to present a diameter greater than the diameter of the plates.

According to a particular embodiment, a supple, flat, circular joint is provided between the two plates and not projecting therebeyond, as well as a second circular joint coming into position on the periphery of the preceding one, this joint being shaped to be able to adapt itself substantially to the inclination of the ground. It may therefore be a question of a second flat joint, of a joint presenting an inclined surface or, preferably, of a flat joint cut into two parts along an inclined plane so that, in the case of horizontal or substantially horizontal ground, the joint is used in its flat form and, in the case of inclined ground, one of the two joints is turned through 180° so that the maximum thicknesses of the two joints coincide. In the latter case, a flat, unequally cut joint may be used, so as to propose to the user different possibilities from the same joint set, as a function of the inclination of the ground, the user being able simply to use one or the other of the two half-joints thus produced or the association of the two.

According to a preferred embodiment of the invention, particularly adapted to a location below ground level, the plate fixed to the anchoring post is formed by a first half-plate secured with the anchoring post and presenting a housing to receive, on the one hand, one end of the linking piece and, on the other hand, a second half-plate having the bore for the linking piece and means for removable fixation in the housing of the first half-plate, in that the linking piece presents the end (for example a flange) shaped to be positioned in the housing of the first half-plate and to be removably immobilized therein when the second half-plate is in place, and in that this half-plate preferably includes the inclined or convex surface. The removable link between the two half-plates may be produced by any known means, for example by means of screws or, better, of a bayonet or catch fixation system, preferably with a screw or like locking.

The anchoring post and corresponding plate may also be one and the same piece and includes means for fixation on a surface. This embodiment is adapted in particular, but not exclusively, for fixation on a vertical surface for the suspension of signs or signalling panels.

The linking piece preferably comprises a circular groove near at least one of its two ends and the plate comprises one or more bores intended to receive means, for example points or screws, inserted in the groove to maintain the linking piece in place, this groove further being separated from the outer surface of the linking piece by a zone of diameter which is constant or not, intermediate the diameter of the linking piece and that of the groove.

According to an advantageous modality of the invention, in its part intended to be fixed to the pole, marker or the like proper, the upper plate is arranged so as to be able to receive poles, markers or the like of different diameters. For example, two or more shoulders of different sections or diameters decreasing from the periphery of the plate may be provided to that end, each section or diameter being able to receive poles of corresponding section or diameter.

These shoulders may be inscribed in the same plane orthogonal to the median axis of the linking device or in different planes, preferably with the reduction of section or diameter being made in the direction opposite the location of the linking piece. The shoulders may be of any shape as a function of the geometrical shape of the pole, e.g. circular, oval, rectangular, square, etc. . .

The invention also relates to the linking device formed by the two plates and by the linking piece, as defined hereinbefore. This device generally comprises a linking piece including a zone of lesser resistance and two plates each including a central bore having an inner diameter slightly larger than the outer diameter of the linking piece. The two plates are adapted to be mounted on the linking piece and to face each other by opposite surfaces of which at least one is inclined, preferably of generally convex shape, the linking piece being designed to be able to be removably immobilized with respect to the two plates, so that, after immobilization of the three pieces with respect to one another, a space remains between the two surfaces, in which the zone of least resistance is located.

BRIEF DESCRIPTION OF THE DRAWINGS

The invention will now be described in greater detail with the aid of embodiments given by way of non-limiting examples and with reference to the drawings, in which:

FIGS. 2 and 3 show in partial section two other embodiments provided so that the anchoring post and its plate can be placed below ground level.

FIG. 5 is a view in partial section of another embodiment, and

DESCRIPTION OF THE PREFERRED EMBODIMENT

Figure 1:
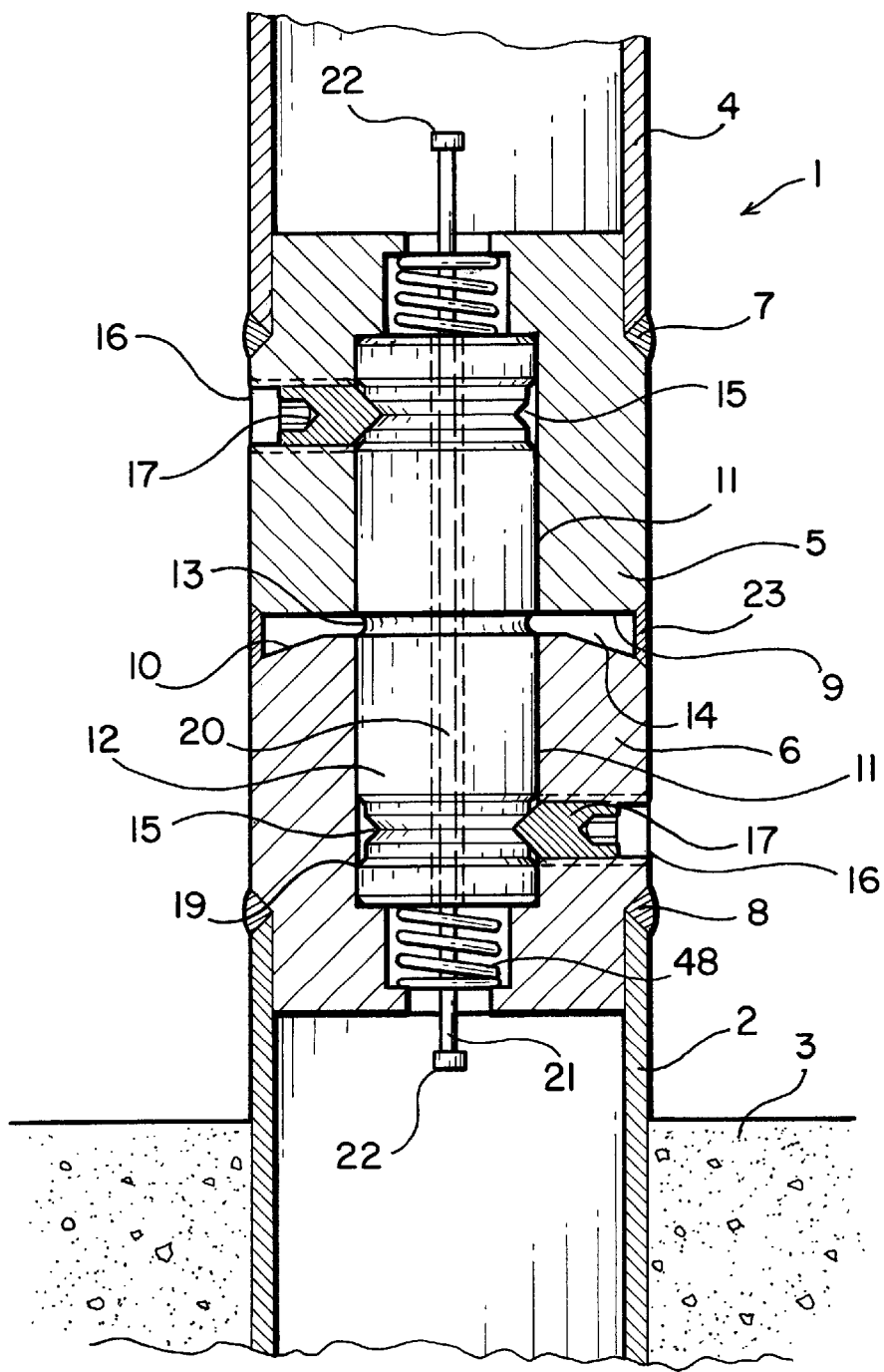
FIG. 1 shows a view in partial section of a pole according to the invention.

FIG. 1 shows a signalling pole 1 comprising an anchoring post or base 2 sealed in the ground 3 and the pole 4. Pole and anchoring post are formed from a cylindrical metal tube. FIG. 1 shows that the pole and the anchoring post each comprise a plate or block elements 5, 6 respectively. Each plate is fitted in the pole or the corresponding post and fixed by a welding bead 7, 8 respectively; Of course, other fixing means may be provided for the plates.

The opposite surfaces of the plates or blocks 5 and 6 are referenced 9, 10 respectively. Surface 9 is plane while surface 10 presents a curvature so as to give surface 10 a generally convex form.

The two plates or blocks 5 and 6 include a central bore 11 of generally cylindrical shape, adapted to receive, tightly, a linking piece 12 having a circumferential groove 13. When the linking piece is in place, it leaves a space 14 between the two surfaces 9, 10 of the plates 5, 6, in which space the circumferential groove 13 is inscribed. It is clearly seen that the central bores 11 and the linking piece 12 are centered on the median axis of the post and the upright or pole proper.

In the vicinity of each of its two ends, the linking piece 12 has grooves 15. Opposite these grooves, when the linking piece 12 is in place, each of the plates 5 and 6 has three threaded transverse bores 16 intended to receive threaded fasteners 17 of which the inner end engages in the groove to maintain the linking piece in place. It will be noted that groove 15 presents a complex form with a part intended to receive the point in position of fixation and a part 19 of diameter intermediate the outer diameter of the linking piece and the diameter of this groove, this part 19 being provided to allow easy dismantling, even in the case of shock of high intensity with risk of damage at the point of contact between point and groove.

The linking piece 12 comprises a longitudinal central orifice 20 receiving a sling or connection 21, which may be a supple or more or less rigid sling, intended to maintain anchoring post and pole attached together after rupture of the linking piece. To that end, the ends of the sling are provided with stop pieces 22 with diameter greater than orifice 20.

A rigid sling may be used, particularly for relatively high poles, designed to avoid the upright falling to the ground too quickly after rupture of the linking piece.

Reference numeral 23 designates a joint intended to obturate the space 14 for sealing and aesthetic purposes. It may be a joint made of plastics material or of a metallic joint.

Reference will now be made to FIG. 2 which shows an embodiment of the invention in which the rupture device is rendered invisible by the fact that it is located below ground level, this making it possible not to modify substantially the outer appearance of the pole. This is particularly interesting in the domain of anti-parking posts and in particular of markers or small posts performing, at the same time, a decorative role, made in particular of cast iron, stainless steel and presenting various shapes, namely of constant diameters or of irregular diameters, for example generally conical, triangular, or oval in shape.

The anchoring post 30, sealed in the ground 3, presents an inner thread 32 intended to cooperate with an outer thread 33 borne by the plate or block element 31. A flat, circular joint 34 is provided between the plate and the anchoring post so as to ensure tightness with respect to the threading.

As in the preceding embodiment, the plate 31 or has block element three bores 16 intended to allow passage of the fastener points 17 intended for fixation of the linking piece 12 in the plate 31. It will be noted that the access to the point of plate 31 can be effected only after screwing and withdrawal of the plate 31 with respect to the anchoring post 30.

The anchoring post and the plate or block element 31 are placed in the ground so that the surface 35 of the plate 31 which, here, is a surface of generally convex shape, lies slightly below the level 3a of the ground. It will be noted that, in this embodiment, when the linking piece 12 is in place, the edge 36 of the linking piece 12 which upwardly defines the circumferential groove or area of reduced dimension 13, lies substantially at ground level.

The pole 37 is, here, directly manufactured with the plate or block element 38. Here a pole of cast iron essentially hollow, but presenting an initially solid part in which a blank may be formed in the foundry, allowing the subsequent machining of the bores intended to receive the linking piece 12 and the end of the sling 21, and bores intended to receive the points of three fasteners 17.

The lower surface 40 of the plate 38 is, here, a plane surface. When the assembly is mounted, it will be noted that this surface 40 lies substantially at ground level, in the plane of the edge 36. During assembly, there is interposed between surfaces 40 and 35, a supple, flat, circular joint 41 which, in the event of a shock, can deform under the effect of the deformation of the linking piece 12, which will avoid any damage of the seal.

Figure 3:
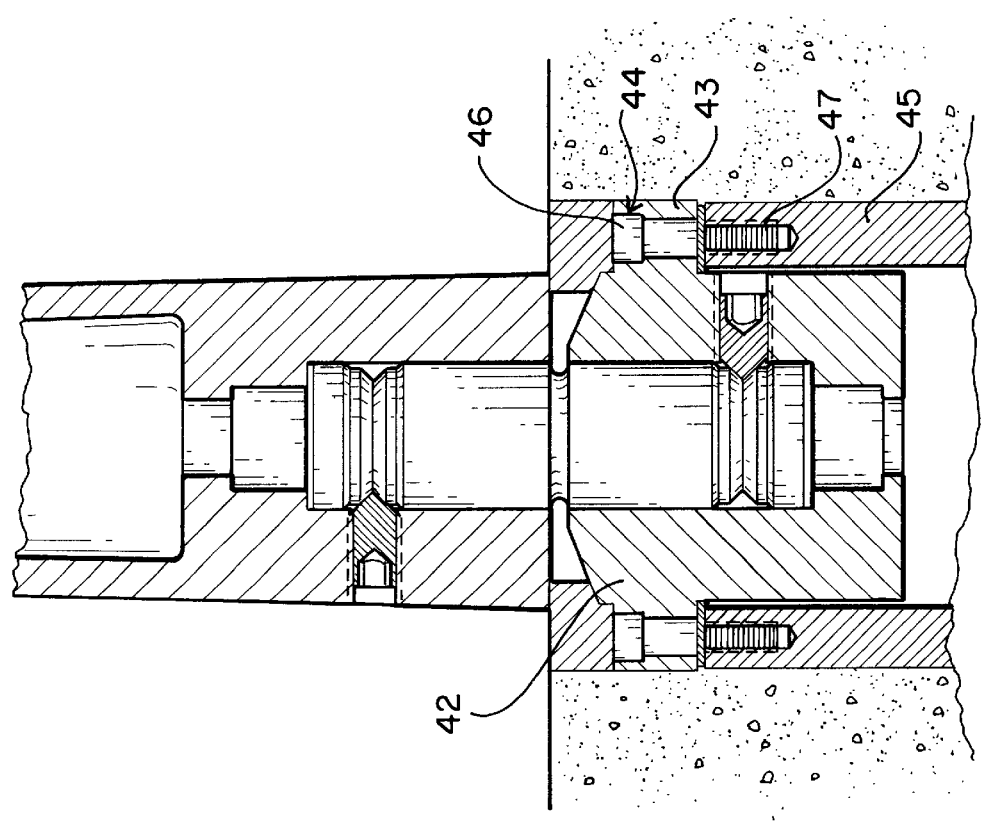

FIG. 3 shows a variant embodiment of FIG. 2, in which the fixation of the lower plate is made differently.

This plate or block elements 42 presents a peripheral flange 43 having bores 44 coming opposite corresponding bores 47, threaded and made in the anchoring post 45. It will be understood that the plate 42 is fixed on the anchoring post by screws 46.

Of course, other variants of fixation of the lower plate may be envisaged, such as the embodiment of a bayonet system.

Figure 4:
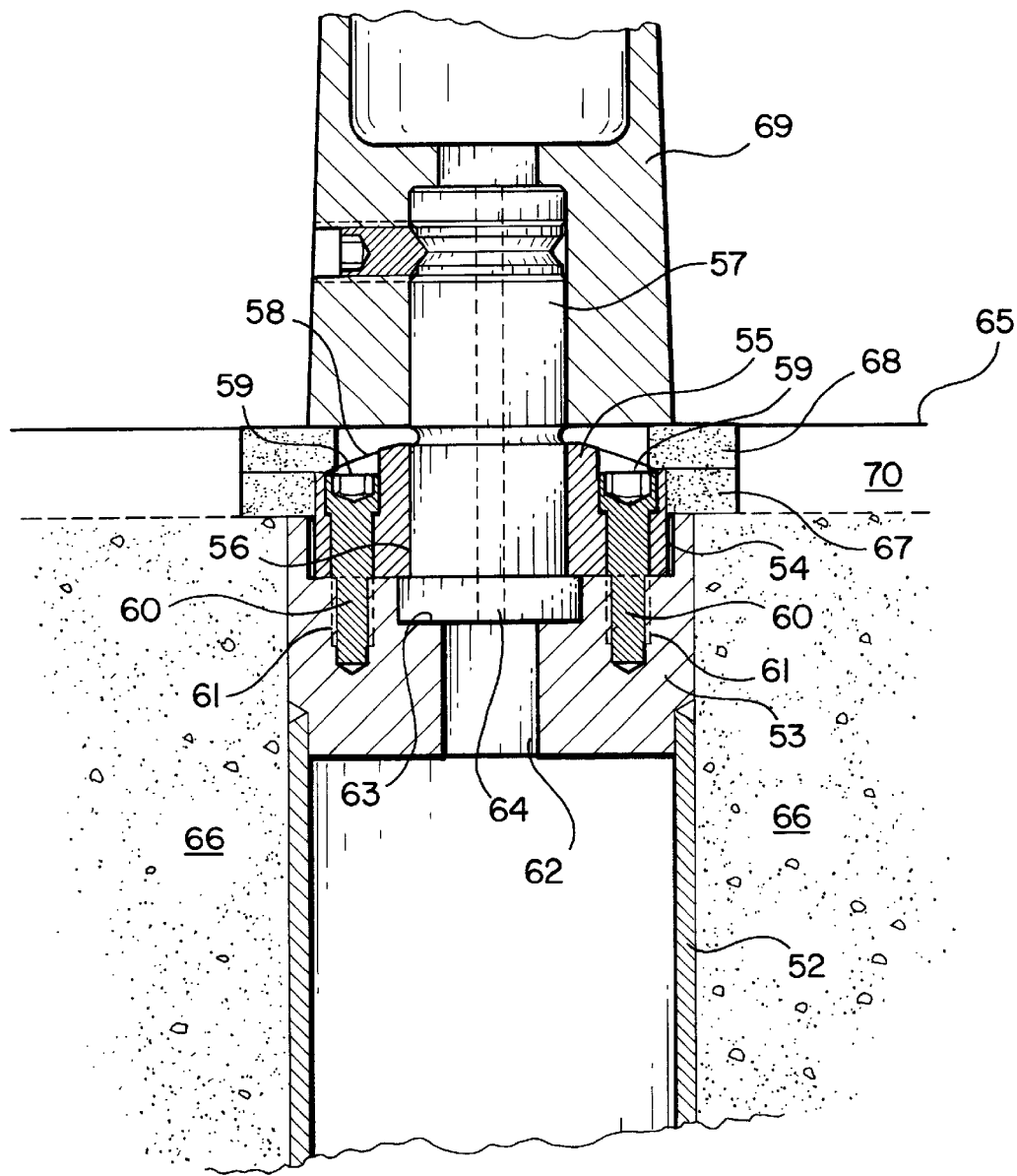
FIG. 4 shows in section a plate according to a particular embodiment.

FIG. 4 shows the preferred embodiment in the case of a link below ground level. The plate fixed to the anchoring post 52 is formed by a half-plate 53 welded to the post and presenting in its upper part a circular housing 54 intended to receive the other half-plate 55. This half-plate 55 has a bore 56 adapted to receive a linking piece 57. The half-plate 55 presents a curvature 58 going from the bore 57 to the periphery of the half-plate 55. In the region of this curvature 58, it further has bores 59 for the passage of screws 60 intended to fix the two half-plates 55 and 53 together by screwing in corresponding threaded holes 61. The half-plate 53 a central bore 62 with, in its upper part, a part 63 of larger diameter. The linking piece 57 presents a flange 64 which, on being housed in part 63, may be immobilized in place by the fixation of the half-plate 55 on the other 53 by screws 60.

As in the embodiments of FIGS. 2 and 3, this assembly is sealed below ground level 65. The seal 66 proper stops, upwardly, at the upper end of the half-plate 53. This is symbolized by the broken line in FIG. 4. Two circular joints 67, 68 (or one single joint) are placed between this end and the surface 65. It is seen that, as in FIGS. 2 and 3, the pole 69 will be in contact with this joint, which is deformable.

The space 70 between the surface 65 and the seal 55 is filled with an appropriate material such as stone, cement, asphalt, etc. . .

For the rest, the linking piece comprises, as before, the circumferential groove, the groove for the engagement of the fastener points for fixation to the pole and the longitudinal central bore with the sling.

An elastic means such as a spring 48 (FIG. 1) may be provided between the plate and the end of the linking piece, in order to facilitate withdrawal of the latter from its housing in the plate.

In the different embodiments, anchoring post and associated plate may have standard dimensions in order to be usable with poles and associated plates of various shapes and diameters.

Reference will now be made to FIG. 5, which shows a plate or block element 50 having presenting sealing flanges 51 allowing the plate 50 to be fixed on a vertical surface. Furthermore, the plate 50 presents the characteristics allowing it to accommodate a linking piece according to the invention. The plate 50 therefore performs the role, here, of anchoring post intended in particular for a mural signalling or for signs.

Figure 6:
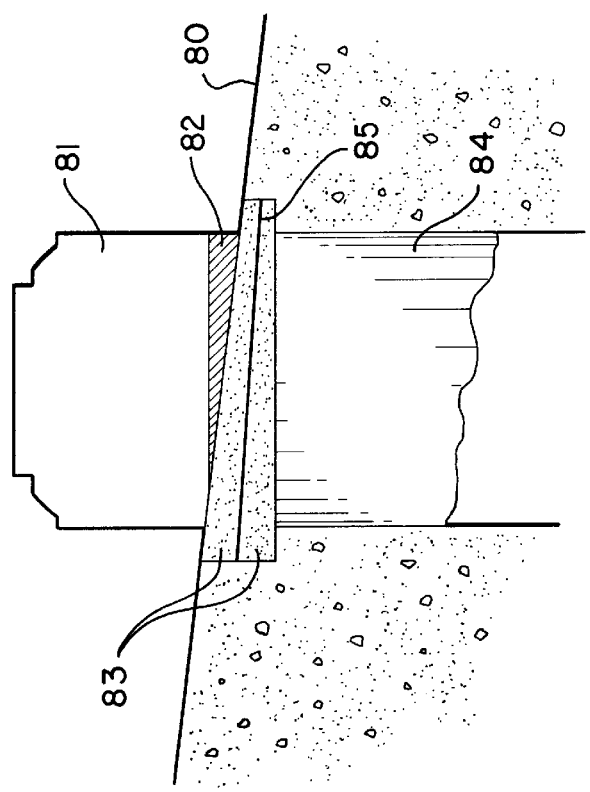
FIG. 6 schematically shows a mode of adaptation to inclined ground and an upper plate with shoulders.

In any case, the linking device may be adapted for positioning on an inclined surface 80 (pavement, road), the pole with its upper plate or block element 81 remaining vertical (cf. FIG. 6). A set of 2 circular joints 82, 83 may in particular be used. One, 82, is of constant section and is placed in the space between the two plates 81, 84 in which it is totally inscribed. The other joint 83 is a flat joint cut into two along an inclined plane 85 and giving two substantially equal parts. This joint 83 may be used in its flat form in the case of horizontal ground or, as shown in FIG. 6 (inclined ground), after turning one of the parts over through 180°, in its inclined form in order to follow the inclination of the ground.

In a variant, the inclined plane 85 may have two unequal parts, which allows a greater flexibility of use, the installer being able to place one or the other of the two parts of different inclinations or the two superposed, depending on the slope of the ground.

A specific set of joints 83 of different shapes may also be resorted to.

FIG. 6 also shows that, in its upper part, the upper plate 81 has two shoulders of different diameters enabling two diameters of pole to be accommodated.

Anchoring post, pole proper, plates, linking pieces may, of course, be made of different materials. The poles may generally be made of metal, such as iron, aluminium, cast iron, or of plastics material and even wood. The linking device according to the invention may be made of metal, particularly steel or brass, or of plastics material, particularly reinforced plastics material. The device according to the invention may of course be adapted to the different geometrical shapes that the poles may have in general. Similarly, the person skilled in the art may select the constituent materials as a function of the desired shock resistance.

What is claimed is:

1. In a pole structure including anchoring member and a vertical upright member linked together by a linking piece including a zone by reduced resistance to force and wherein opposing portions of the anchoring member and the upright member have a space therebetween in which said zone of reduced resistance is positioned and wherein the linking piece includes a central longitudinal bore through which a link member extends to provide a link between the anchoring member and the upright member should the linking piece rupture, the improvement comprising; said opposing portions of the anchoring member and the upright member each include a block member, each block member having a central bore adapted to receive the linking piece, and at least one of said block members having an inclined surface sloping from its center towards its periphery such that a space between the two opposing block members is greater at the periphery of the pole than at its center.

2. The pole according to claim 1 wherein the inclined surface of the at least one block member is a surface of generally convex shape.

3. The pole according to claim 1 wherein said block members are removably fixed to the upright member and the anchoring member.

4. The pole according to claim 1 characterized in that said block member of the anchoring member is formed of a first half-block secured to the anchoring member and having a housing for accommodating an end of the linking piece and a second half-block having said bore for said linking piece, means for removably securing said second half-block to said first half-block and to thereby secure said linking piece in said housing of said first half-block, and said second half-block including said inclined surface.

5. The pole according to claim 1 wherein said anchoring member and its corresponding block member are removably secured together and are adapted so as to be placed substantially at ground level.

6. The pole according to claim 5 wherein a supple circular joint is provided between said block members adjacent a periphery thereof and an outer diameter of said joint being larger than a diameter of the upright member.

7. The pole according to claim 5 characterized in that a first supple joint is provided between said block members and a second joint is placed along a periphery of said first joint, and said second joint being shaped so as to change an angle of inclination of a surface of said second joint.

8. The pole according to claim 1 wherein said block member of the upright member is integral with the upright member.

9. The pole according to claim 1 wherein said anchoring member and its corresponding block member are integral and said anchoring member including means adapted to mount said anchoring member on a vertical surface.

10. The pole according to claim 1 wherein the linking piece includes adjacent one of its ends a circular groove and at least one of said block members includes at least one bore in which is received fastening means insertable with respect to said groove to thereby maintain the linking piece in place, said groove being further separated from an outer surface of the linking piece by a zone having a diameter which is intermediate a diameter of the linking piece and a diameter of the groove.

11. A linking device adapted to link together two parts of a pole, said linking device including a linking piece having a zone of reduced resistance to force and two block elements each having a central bore with an inner diameter slightly greater than an outer diameter of the linking piece, the two block elements being adapted to be mounted about the linking piece and having opposite facing surfaces of which at least one is inclined and of generally convex shape, means for removably securing said linking piece with respect to said two block elements whereby space is created between the two opposite surfaces and which space is in alignment with said zone of reduced resistance to force.

* * * * *